United States Patent [19]
Lucke, Jr. et al.

[11] 3,738,161
[45] June 12, 1973

[54] MICROFICIAL HARDNESS TESTER INDENTER

[75] Inventors: Charles H. Lucke, Jr., Stratford; Andrew R. Fee, Trumbull, both of Conn.

[73] Assignee: American Chain & Cable Company, Inc., New York, N.Y.

[22] Filed: Jan. 19, 1970

[21] Appl. No.: 4,051

[52] U.S. Cl. .................................................. 73/85
[51] Int. Cl. ............................................. G01n 3/44
[58] Field of Search ................... 73/85, 81, 83, 82, 73/84; 33/189, 191

[56] References Cited
UNITED STATES PATENTS
1,991,238  2/1935  Willey.................................. 73/85

OTHER PUBLICATIONS

Lysaght, "Indentation Hardness Testing" pp. 110, 111, P.O. Lib. No. TA 407 L96, 1949

*Primary Examiner*—James J. Gill
*Attorney*—Pennie, Edmonds, Morton, Taylor and Adams

[57]  ABSTRACT

An improved diamond indenter for measuring the hardness of thin material, the indenter having flattened sides and a flattened end for reducing the depth of penetration under the applied loads.

2 Claims, 2 Drawing Figures

INVENTORS
CHARLES H. LUCKE, JR
ANDREW R. FEE
BY
ATTORNEYS

MICROFICIAL HARDNESS TESTER INDENTER

BACKGROUND OF THE INVENTION

In measuring the hardness of metal and other material, hardness testing equipment such as used with the Rockwell hardness scale includes a diamond indenter for penetrating the test specimen to a measurable depth. The test specimen is first pressed against the indenter under a minor load to produce a slight indentation therein. The indenter is then pressed against the test specimen under a major load of known magnitude greater than the minor load to further indent the surface of the specimen. Next, the major load is removed and with the minor load applied the difference between depth of these two indentations is measured, using a hardness scale such as the Rockwell scale, to determine the actual hardness of the specimen.

The above described procedure is used to measure the hardness of materials which are thick enough so that the thickness does not become a controlling factor in making an accurate measurement. As a matter of practice, the total depth of indentation produced by both minor and major loads is kept to about 10 percent or less of the thickness of the material. Otherwise, the hardness measurement is affected by the support on which the specimen rests during testing.

In construction, conventional indenters are made of a diamond having frustroconical sides and a spherical tip for making the indentations. Also, diamond indenters of a pyramid construction having four sides converging at 136° to a sharp point are in common use.

It has been proposed to construct an indenter with a pointed multi-edged pyramidal shape formed by a number of flat sides, as for example 12, and by forming a flattened end where these sides meet. Here, the included angle between the opposite sides is about 120° while the distance across the opposite sides of the flattened end is about 0.040 millimeters. This construction is said to prevent the indenter from shifting laterally as it penetrates into the metal being tested and to permit the indenter to more easily penetrate into the metal.

In measuring the hardness of very thin materials, as for example, materials having a thickness as small as one one-thousandth of an inch, spherical tipped indenters of the type described above as well as the multi-sided ones having a great number of converging cutting edges are unsatisfactory. First of all, the depth to which these indenters penetrate the thin test specimen usually approaches, if not exceeds one-tenth the thickness of the material so that the measurement then is affected by the hardness of the support on which the thin material rests. Also, the excessive penetration of the minor load limits the dimensional difference that will result between the minor load indentation and the indentation under the major load. This difference will not be great enough to obtain an accurate reading of material hardness. This inability to obtain an accurate reading is of particular disadvantage when attempting to measure the relative hardness of different materials. In some cases, the thin test specimen is actually pierced or punctured by the indenter. Theoretically, the depth of penetration of the minor and major loads could be controlled to provide an acceptable measurement of hardness. However, as a practical matter, test equipment cannot be designed mechanically to produce a minor load light enough to assure a sufficient difference in penetration between minor and major loads so as to obtain an accurate measurement of the relative hardness of different materials.

To overcome the problem of excessive penetration, when measuring the hardness of thin materials, it is the general practice to apply a single load of known value to the specimen and then measure the lateral dimension of the indentation. A comparison of the lateral extent of the indentations on different materials can then be used to determine variations in hardness from a known value.

SUMMARY OF THE INVENTION

In accordance with the teachings of the present invention, there is provided an improved indenter usable for measuring the hardness of thin materials by applying minor and major loads and measuring the difference in the depth of penetration. In construction, the improved indenter is of pyramid construction with four flat sides and a flattened end limiting the depth of penetration under a given load. With the improved indenter of the present invention, the total depth of the indentation produced in the thin material may be restricted to one-tenth the thickness of the material so as to avoid being affected by the hardness of the supporting surface. Also, the indenter produces an indentation under the minor load which is small enough so that the difference between minor load indentation and major load indentation is sufficiently great so that an accurate measurement of the hardness of the material can be obtained without lessening the sensitivity of the penetrator to measuring the relative hardness of different materials. With the improved indenter of the present invention, the sensitivity of the measurements on thin materials is substantially the same as the sensitivity of the pointed indenter conventionally used for measuring the hardness of thick materials.

DETAILED DESCRIPTIONS OF THE INVENTION

Figure 1:
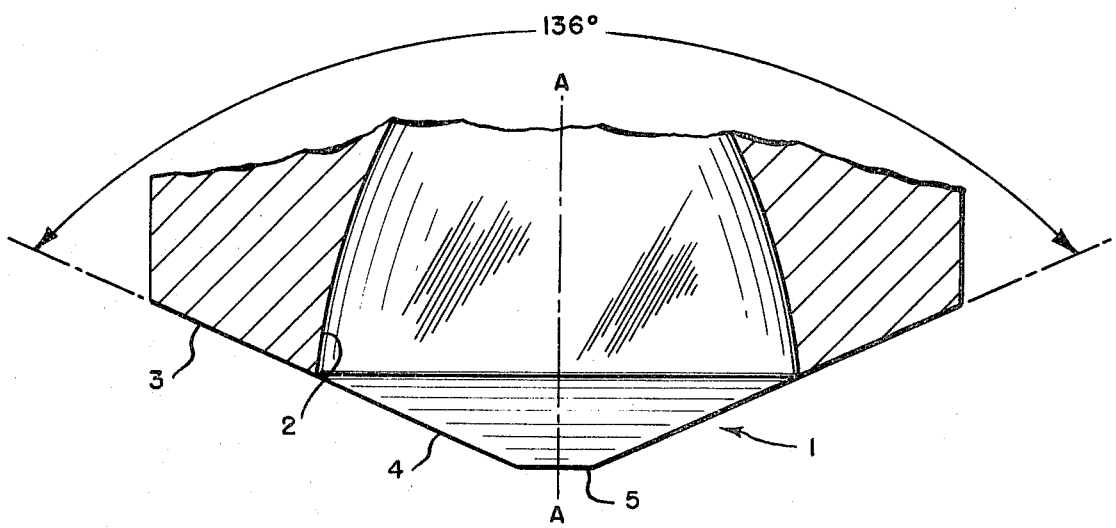
FIG. 1 is a side elevation view of the indenter of the present invention.
Figure 2:
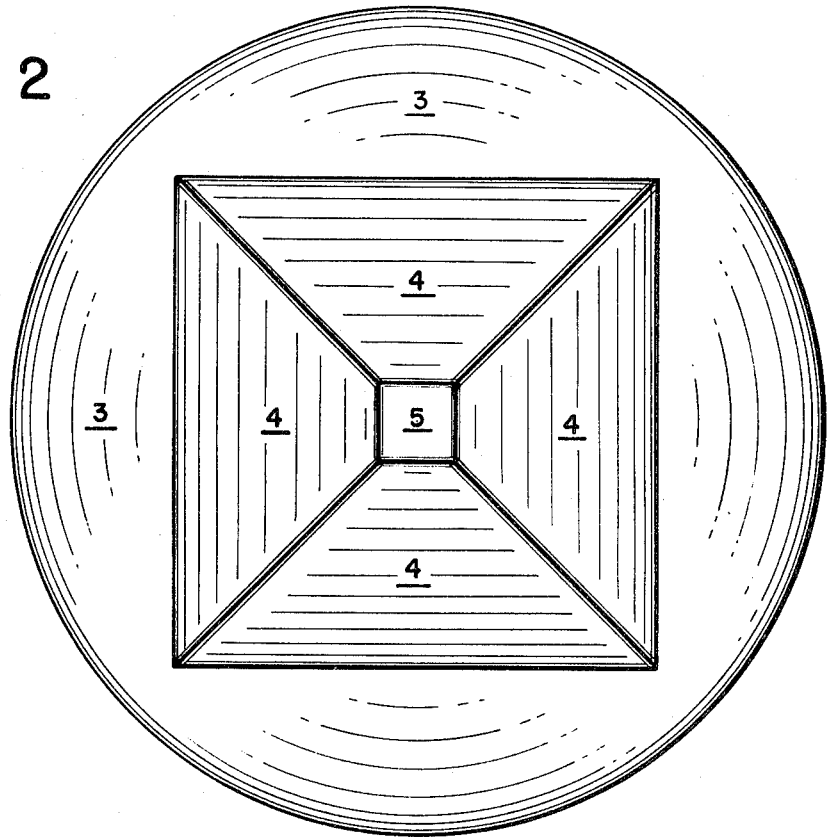
FIG. 2 is a bottom plan view of the indenter of the present invention.

With reference to FIG. 1, the indenter 1 of the present invention is mounted in a conventional manner in a recess 2 formed in a housing member 3. In construction the indenter 1 is formed with four flat sides 4 arranged in the shape of a pyramid. The included angle between oppositely disposed sides is 136 degrees. The tip of the indenter is ground to a flat surface 5. As shown in FIG. 2, the flat surface 5 is square in shape and occupies a plane extending in a direction perpendicular to the longitudinal axis A—A of the housing structure. The size of the flat surface approaches that where minimum depth of penetration would occur under a minor load in the hardest of materials to be tested. For materials having hardness values ranging from about B40 to C70 on the Rockwell scale the size of the flat is advantageously about 0.020 millimeters or 20 microns on a side.

The indenter of the present invention is well suited for measuring the hardness of thin materials. The term thin material as used herein includes thin coatings, thin sheet material such as aluminum foil, and, in general any material in which there is a danger of excessive penetration by the indenter under the applied force of the minor and major loads.

In making a measurement of the hardness of a thin material with the indenter of the present invention, a minor load of from about 50–80 grams is first applied to produce a first indentation in the material. A major load of about 1,000 grams is then advantageously used for producing the further penetration into the material and the difference between the depths of the two penetrations measured and interpolated to obtain the desired hardness measurement. When the flat surface of the indenter is brought to bear on a thin test specimen, the depth of penetration is kept within acceptable limits whereby hardness readings on different materials can be made with a sensitivity comparable to that of conventional indenters used with thicker materials.

We claim:

1. In a diamond indenter for testing the hardness of thin materials having a thickness of about one one-thousandth of an inch, the improvement wherein the indenter has:
   a. a four-sided pyramid shaped end portion with the included angle between opposite sides being 136°; and
   b. a flattened tip disposed in a plane extending perpendicular to the vertical axis of the pyramid, said tip being square in shape with a dimension of about 20 microns to a side to provide a surface area which minimizes the amount of penetration occurring on the hardest of materials to be tested.

2. The method of testing the hardness of thin materials having a thickness of about one one-thousandth of an inch comprising the steps of:
   a. pressing the material under a minor load of from about 50–80 grams with an indenter having a four-sided pyramid shape with the included angle between opposite sides being about 136° and a flattened square tip with a side dimension of about 20 microns;
   b. pressing the material under a major load of about 1,000 grams with said indenter;
   c. measuring the difference in penetration of the material as caused by the indenter under said minor and major loads; and
   d. interpolating the measured difference in penetration into a measurement of material hardness.

* * * * *